Dec. 8, 1936.  A. F. HARBO  2,063,501
DEVICE FOR TEACHING MUSIC READING
Filed June 11, 1934
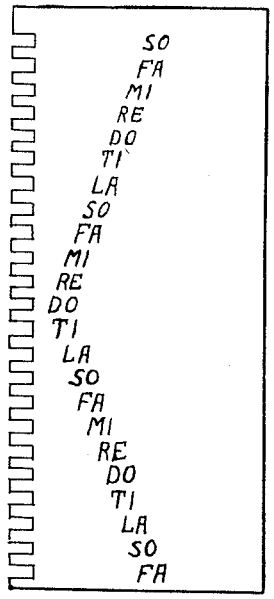
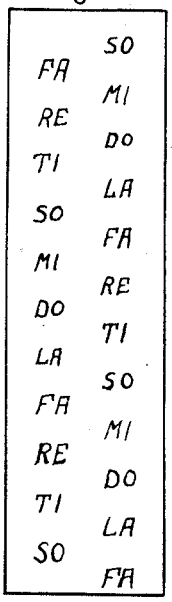
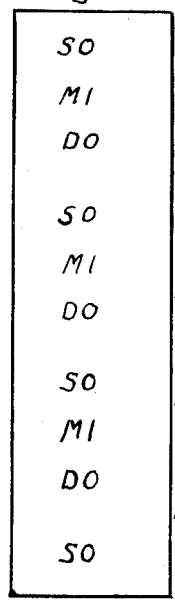
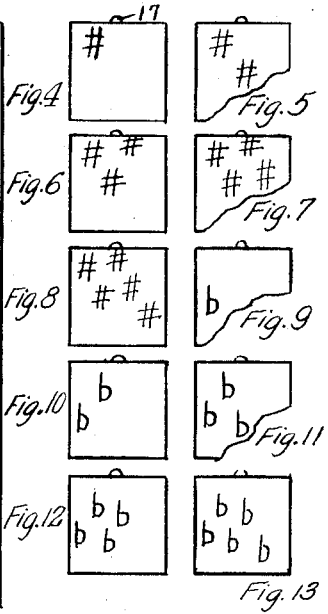
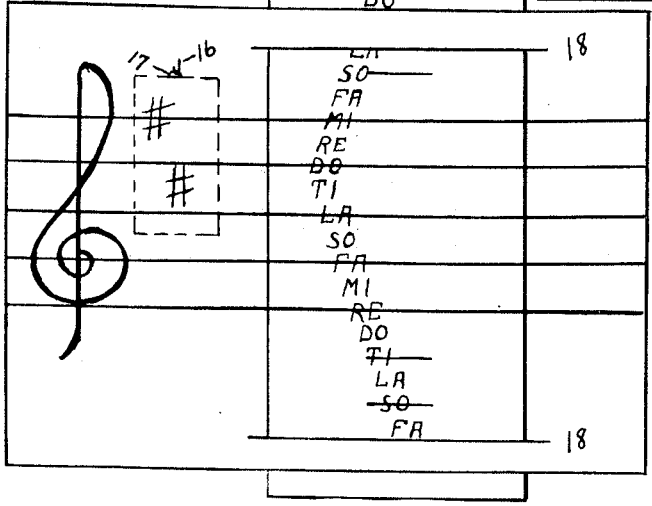
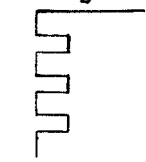
Inventor
Alf F. Harbo Patented Dec. 8, 1936

2,063,501

UNITED STATES PATENT OFFICE 2,063,501

DEVICE FOR TEACHING MUSIC READING

Alf F. Harbo, St. Cloud, Minn.

Application June 11, 1934, Serial No. 730,030

1 Claim. (Cl. 84—471)

My device is designed to aid the teaching of the syllables do, re, mi fa, so (or sol), la, and ti which are used in music reading. The so-called "movable do" system of music reading is used almost entirely in the schools in this country. In this system the seven different tones of the diatonic scale are given the names do, re, mi, fa, so (or sol), la, and ti, and "do" can be on any line or space of the staff,—depending on the key in which the music is written. In my experience in teaching music reading I have found that the pupil's greatest difficulty lies in visualizing the syllables in the various keys. This device will overcome this difficulty.

Referring to the drawing, Figures 14 and 15 are plan views of the device. Figures 1 to 13 inclusive show individual parts unassembled, and Figure 16 shows the notched edge of the cards in Figures 1, 2, and 3.

I shall first describe the parts that make up the device and then explain how it is to be used.

Figure 1 is a transparent, fairly stiff card of celluloid, cellophane, or some similar substance upon which are printed the syllables do, re, mi, fa, so, la, ti, do (sequence repeated twice).

Figures 2 and 3 are the same as Figure 1 with the exception of different arrangements of the syllables. Figure 3 represents only the tonic chord, do, mi, so, and do (sequence repeated).

Figure 4 represents a small piece of same material as in Figure 1 with the character ♯ (sharp) printed on it in such a place that when it is hooked on Fig. 14 at 16 by means of metal loop or eye, 17, it will show the key signature for G major (one sharp on top line of staff—with treble clef).

Figures 5 to 13 inclusive are the same as Figure 4 except that they represent the remaining common key signatures. Any other desired key signatures can be made in the same way.

Figure 14 shows an opaque card, 21, on which are printed a music staff with ledger lines and a treble clef. On the card is a metal hook, 16, and two slits, 18, are cut in the card. Through the slits, 18, is inserted a transparent card bearing the music syllables. The transparent card has a notched edge.

Figure 15 shows Fig. 1 inserted through slits, 18, in Fig. 14 and placed so that the syllables are in place for the key of D major, and Fig. 5 is hooked to Fig. 15 at 16 thus providing the correct key signature for D major.

Figure 16 shows a part of a notched edge which may be used on one vertical side of the cards shown in Figs. 1, 2, and 3.

The parts described in Figs. 1 to 14 inclusive can be made in a small size for individual use or a large size for classroom use. The sizes of parts of device approximately as follows: Individual size—Figs. 1, 2, and 3—2″ x 6″, Fig. 14—14″ x 6″, Figs. 4 to 13—¾″ x 1½″. Classroom size—Figs. 1, 2, and 3—8″ x 24″, Fig. 14—20″ x 36″, Figs. 4 to 13—14″ x 10″.

Use of the device:

The teacher wishes pupils to learn the syllable names for notes on the lines and spaces in the key of D major. The key signature of two sharps, Fig. 5, is placed on Fig. 15 at 16 and Fig. 1 is inserted through the slits, 18 on Fig. 15 so that "do" will be on the first space below the staff (or on the fourth line of staff from the bottom). The arrangement is illustrated in Figure 15. Pupils can now see the names of the lines and spaces for the key of D major. This can be followed by a drill on the staff, Fig. 14, with Fig. 1 removed, by having the teacher point to the different lines and spaces and pupils responding by naming or singing the syllables. Teacher would next have the class sing the syllables for songs in D major. The procedure would be the same for all other keys.

It is important to note that although it is simple enough to write a staff with the key signature and syllables for D major, or any other key, on the board it takes much time to do that in many keys. Also, this kind of work must be repeated almost daily throughout the grades 3 to 8 before the pupils become good readers of music. Since this must be done the device will save the teacher much time and make it possible for the teacher to do much more of this kind of work than has been possible here-to-fore.

When beginning the teaching of the syllables the syllables do, mi, so, do are taught first—usually in about the third grade. Fig. 3 represents the arrangement of syllables which could be used for this purpose.

I have stated that this device can be used in two sizes—a large size for classroom use and a small size for individual use. The above describes the use of the classroom size. I shall now describe three ways of using the small individual size:

(1) Same as above except that teacher directs pupils to do as teacher did in above.

(2) As a drill for learning the key signatures and location of "do" in various keys: Teacher instructs pupils to place proper key signature on card and place "do" correctly for the key of E major. Pupils to answer correctly will place Fig. 7 on Fig. 15 at 16 and move Fig. 1 in Fig. 15 so that "do" is on the bottom line. Repeat for all other keys.

(3) Fig. 2, or a card with syllables printed in a single vertical row, can be made with syllables small enough and close enough together so that they can be used independently of the rest of the device. The card can be placed on the staff of a song in a song book in such a manner that "do" is properly placed for the key and thus be used as an aid to reading the syllables of the notes in the song.

The learning of syllables may seem to be a very simple task but the progress made by the average class is very slow and the degree of skill developed by the pupils by the time they are through the eighth grade is far below that desired by music teachers. This device will help a great deal because it helps to visualize the problem for the pupils and will make possible drill work that is hardly possible without the device.

It may be necessary to provide the cards, Figs. 1, 2, and 3, with a notched edge, (on one vertical side) as shown in Fig. 16, to hold the cards in place. If the notches are on the left side of the cards the cards will be securely held in place by moving the cards as far to the left as possible in such a manner that the left extremity of the slit fits into a notch.

I claim:

A music chart consisting of an opaque card upon which is printed a music staff of five lines, with added ledger lines and a clef, the opaque card containing a horizontal slot near the top edge and another near the bottom edge, through which is inserted a transparent card bearing the music syllables, the transparent card having notched edges so that it may be securely fixed at any desired position.

ALF F. HARBO.